US011935100B2

(12) United States Patent
Yin et al.

(10) Patent No.: US 11,935,100 B2
(45) Date of Patent: Mar. 19, 2024

(54) DATABASE MANAGEMENT FOR STORED VALUE MEDIUMS

(71) Applicant: Capital One Services, LLC, McLean, VA (US)

(72) Inventors: Benjamin Yin, McLean, VA (US); Lee Adcock, Midlothian, VA (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 17/302,216

(22) Filed: Apr. 27, 2021

(65) Prior Publication Data

US 2022/0343381 A1 Oct. 27, 2022

(51) Int. Cl.
*G06Q 30/06* (2023.01)
*G06F 16/23* (2019.01)
*G06Q 20/34* (2012.01)
*G06Q 30/0601* (2023.01)

(52) U.S. Cl.
CPC ..... *G06Q 30/0601* (2013.01); *G06F 16/2379* (2019.01); *G06Q 20/348* (2013.01)

(58) Field of Classification Search
CPC ................. G06Q 30/0601; G06F 16/2379
USPC ........................................ 705/26.1
See application file for complete search history.

(56) References Cited

U.S. PATENT DOCUMENTS

| | | | | |
|---|---|---|---|---|
| 6,587,855 B1 * | 7/2003 | Ellmann | ............... | G06F 16/248 |
| 7,512,566 B1 * | 3/2009 | Fellner | ................ | G06Q 20/367 |
| | | | | 705/64 |
| 10,872,349 B1 * | 12/2020 | Hijirida | .............. | G06Q 30/0227 |
| 2010/0030654 A1 * | 2/2010 | Dinkin | ............... | G06Q 20/0855 |
| | | | | 705/26.1 |
| 2011/0010334 A1 * | 1/2011 | Vasudevan | .............. | G06F 16/93 |
| | | | | 707/E17.055 |

(Continued)

FOREIGN PATENT DOCUMENTS

| | | | | |
|---|---|---|---|---|
| GB | 2406185 A | * | 3/2005 | ............. G06Q 30/06 |
| WO | WO-2005091843 A2 | * | 10/2005 | ............. G06Q 20/06 |

OTHER PUBLICATIONS

Technological lifeboat rescues Sand from storm; President bets on database software to boost company: [Final Edition] Bryan, Jay. Edmonton Journal [Edmonton, Alta] Jan. 29, 1997: D. 13; retrieved from Dialog database Nov. 21, 2022 (Year: 1997).*

*Primary Examiner* — Yogesh C Garg
(74) *Attorney, Agent, or Firm* — Harrity & Harrity, LLP

(57) ABSTRACT

In some implementations, a device may receive an indication of information associated with a stored value medium. The device may populate a database with the information associated with the stored value medium, where the database includes a table to link the information associated with the stored value medium with an entity identifier of an entity associated with the stored value medium. The device may receive an indication of an exchange associated with the entity identifier of the entity, where the exchange is not associated with the stored value medium. The device may parse the database using the entity identifier associated with the entity to identify the information associated with the stored value medium indicated in the database. The device may communicate, with a backend system, to enable the exchange to be at least partially completed using the resources associated with the stored value medium.

20 Claims, 8 Drawing Sheets

(56) References Cited

U.S. PATENT DOCUMENTS

| | | | |
|---|---|---|---|
| 2011/0295744 A1* | 12/2011 | Wisniewski | G06Q 20/105 705/41 |
| 2012/0262468 A1* | 10/2012 | Ronayne | G06F 3/147 345/548 |
| 2014/0101044 A1* | 4/2014 | Blackhurst | G06Q 20/4015 705/44 |
| 2015/0317663 A1* | 11/2015 | Chinoy | G06Q 20/202 705/14.26 |
| 2017/0068962 A1* | 3/2017 | Panchamgam | G06Q 30/02 |
| 2019/0164148 A1* | 5/2019 | Suh | G06Q 20/4016 |

* cited by examiner

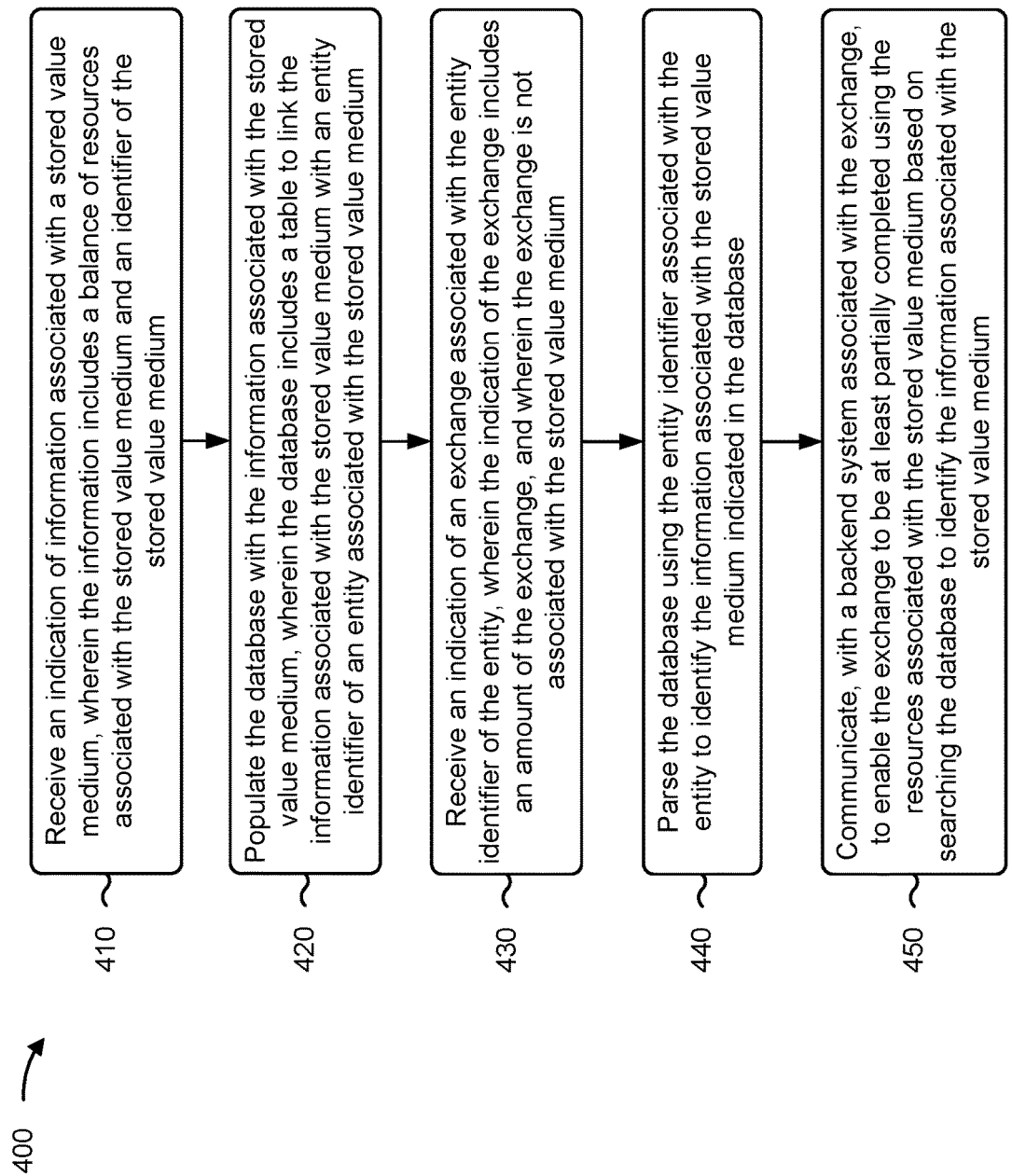

DATABASE MANAGEMENT FOR STORED VALUE MEDIUMS

BACKGROUND

Data storage, such as a database, a table, a linked list, and/or the like, is an organized collection of data. A relational database is a collection of schemas, tables, queries, reports, and/or views, among other examples. Data storage designers typically organize the data storage to model aspects of reality in a way that supports processes requiring information. A data storage management system is an application that interacts with users, other applications, and data storage to allow definition, creation, querying, update, and/or administration of data storage, among other examples.

SUMMARY

In some implementations, a system for creating and managing a data store for stored value mediums includes one or more memories and one or more processors, coupled to the one or more memories, configured to: receive an indication of information associated with a stored value medium, wherein the information includes a balance of resources associated with the stored value medium and an identifier of the stored value medium; populate the data store with the information associated with the stored value medium, wherein the data store includes a table to link the information associated with the stored value medium with at least one of: a user identifier of a user associated with the stored value medium, a card identifier of a card associated with the user, or an entity identifier of an entity associated with the stored value medium; receive an indication of an exchange associated with at least one of the user identifier of the user, the card identifier of the card, or the entity identifier of the entity, wherein the indication of the exchange includes an amount of the exchange, and wherein the exchange is not associated with the stored value medium; search the data store using at least one of the card identifier of the card, the user identifier of the user, or the entity identifier associated with the entity to identify the information associated with the stored value medium indicated in the data store; and communicate, with a backend system, to enable the exchange to be at least partially completed using the resources associated with the stored value medium based on searching the data store to identify the information associated with the stored value medium.

In some implementations, a method for creating and managing a database for stored value mediums includes receiving, by a device, an indication of information associated with a stored value medium, wherein the information includes a balance of resources associated with the stored value medium and an identifier of the stored value medium; populating, by the device, the database with the information associated with the stored value medium, wherein the database includes a table to link the information associated with the stored value medium with an entity identifier of an entity associated with the stored value medium; receiving, by the device, an indication of an exchange associated with the entity identifier of the entity, wherein the indication of the exchange includes an amount of the exchange, and wherein the exchange is not associated with the stored value medium; parsing, by the device, the database using the entity identifier associated with the entity to identify the information associated with the stored value medium indicated in the database; and communicating, with a backend system associated with the exchange, to enable the exchange to be at least partially completed using the resources associated with the stored value medium based on searching the database to identify the information associated with the stored value medium.

In some implementations, a non-transitory computer-readable medium storing a set of instructions includes one or more instructions that, when executed by one or more processors of a device, cause the device to: receive an indication of information associated with a stored value medium, wherein the information includes a balance of resources associated with the stored value medium and an identifier of the stored value medium; populate a data store with the information associated with the stored value medium, wherein the data store includes a table to link the information associated with the stored value medium with at least one of: a user identifier of a user associated with the stored value medium, a card identifier of a card associated with the user, or an entity identifier of an entity associated with the stored value medium; receive an indication of an exchange associated with at least one of the user identifier of the user, the card identifier of the card, or the entity identifier of the entity, wherein the indication of the exchange includes an amount of the exchange, and wherein the exchange is initiated using a medium that is different than the stored value medium; search the data store using at least one of the card identifier of the card, the user identifier of the user, or the entity identifier associated with the entity to identify the information associated with the stored value medium indicated in the data store; and perform an action to enable the exchange to be at least partially completed using the resources associated with the stored value medium based on searching the data store to identify the information associated with the stored value medium.

BRIEF DESCRIPTION OF THE DRAWINGS

FIG. 4 is a flowchart of an example process relating to database management for stored value mediums.

DETAILED DESCRIPTION

Figure 1A:
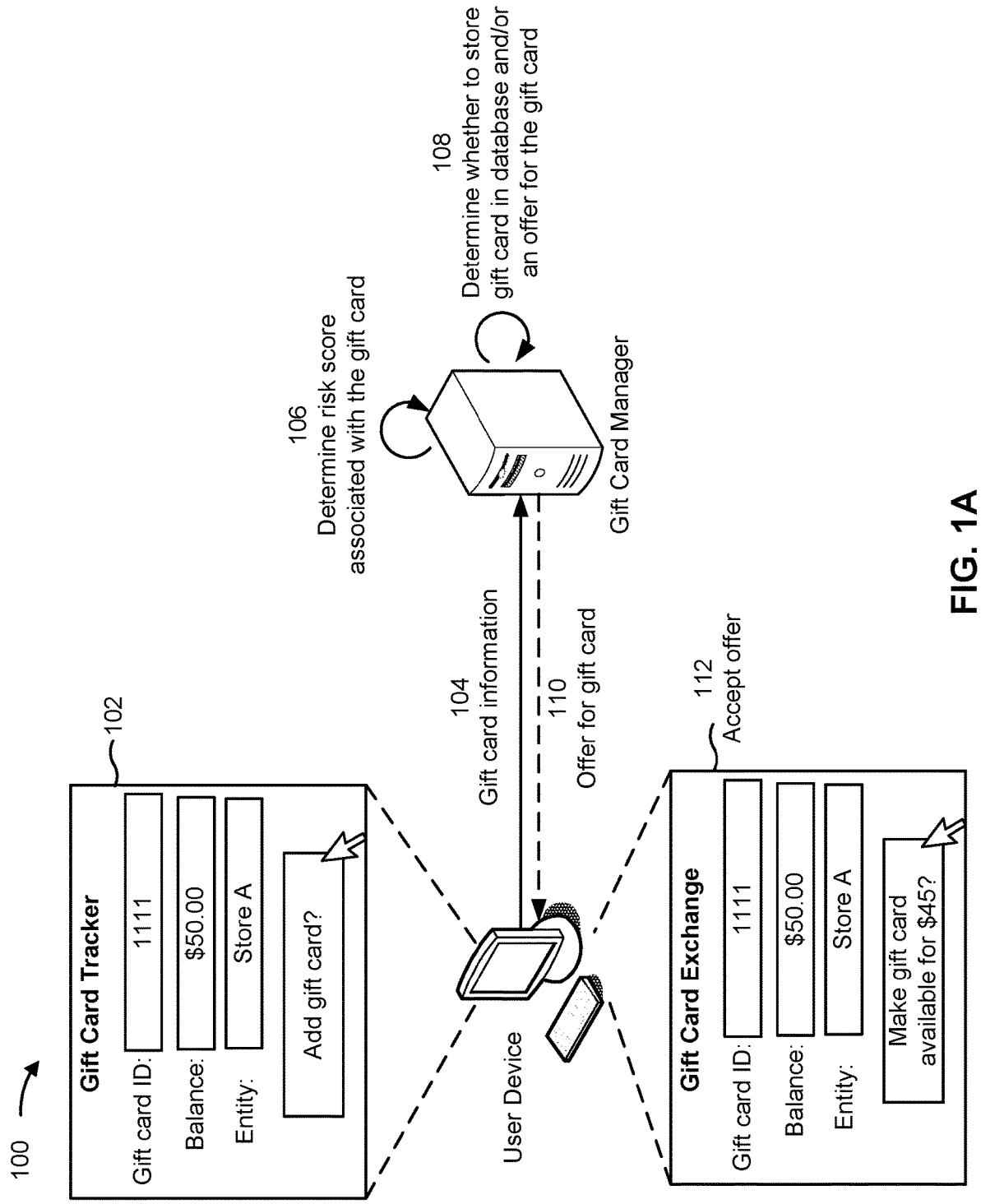
FIGS. 1A-1E are diagrams of an example implementation relating to database management for stored value mediums.

The following detailed description of example implementations refers to the accompanying drawings. The same reference numbers in different drawings may identify the same or similar elements.

A stored value medium may be a prepaid stored value card that can be redeemed at an entity (e.g., a merchant) or at one or more entities. A stored value medium (e.g., a gift card) can be used as an alternative to cash or credit/debit purchases at a particular entity (or a set of entities). A stored value medium may also be referred to as a gift card, a stored value card, a gift certificate, a gift voucher, a store credit, and/or a gift token, among other examples. However, gift cards often go unused, resulting in a waste of the prepaid stored value on the gift card. For example, a user may receive a gift card associated with an entity or merchant at which the user does not often visit or shop, or a user may forget about the gift card and not use it. Moreover, in some cases, gift cards may expire after a certain amount of time (e.g., according to an expiration date of the card). Therefore, if the user does not use the gift card prior to the expiration date of the gift card, the prepaid stored value on the gift card may be wasted. In some cases, a user may be more likely to use another medium to conduct transactions. For example, the user may frequently use one or more transaction cards (e.g., debit cards and/or credit cards). For example, a user may own a gift card associated with an entity (e.g., a merchant or a vendor). However, the user may not think to use the gift card (e.g., the user may forget about the gift card) when transacting with the entity and may instead use one of the transaction cards with which the user typically conducts transactions. As a result, the gift card of the user goes unused, resulting in a waste of the prepaid stored value on the gift card.

Additionally, backend systems may process transactions for stored value mediums and other mediums differently. For example, a backend system for an entity may process transactions associated with a stored value medium (e.g., a gift card) of the entity internally. In other words, the backend system may utilize internal systems and databases (e.g., internal to the entity) to identify the stored value medium, identify stored resources associated with the stored value medium, and apply the stored resources to settle a transaction (or a portion of a transaction). Therefore, the backend system of the entity may not communicate with any external systems or devices to settle transactions using resources of a stored value medium associated with the entity. Conversely, for transactions associated with other mediums, such as a transaction card associated with an institution, the backend system of the entity may need to communicate with a backend system of the institution to receive approval (e.g., to receive approval that the transaction card has a necessary amount of resources to complete the transaction) in order to complete the transaction. As described above, transaction cards associated with an institution may be more frequently used to complete transactions. However, as a backend system of an entity processes transactions for stored value mediums (e.g., gift cards) and other mediums (e.g., transaction cards) differently, the backend system is unable to use resources of a stored value medium to settle transactions initiated using another medium.

Some implementations described herein are associated with database management for stored value mediums to enable a backend system to use resources of a stored value medium to settle transactions initiated using another medium (e.g., a transaction card). For example, to enable resources of a gift card to be applied to a transaction without the gift card being presented or identified to the entity at the initiation of the transaction, a system (e.g., associated with an institution that provides transaction cards) may maintain a relational database or a data store of gift card information. A system may maintain the relational database of gift cards and may actively monitor and/or update the database (e.g., removing expired gift cards and/or updating balances of gift cards). The relational database or data store may enable the system to store gift card information in such a way that the system can identify one or more transactions (e.g., initiated using a transaction card provided by the institution) associated with an entity (e.g., a merchant or vendor) and/or a user (e.g., associated with the transaction card) and parse the database to identify one or more relevant gift cards that can be used to settle the transaction (or a portion of the transaction). For example, the system, when communicating with a backend system associated with the entity, rather than simply providing approval for an amount of the transaction, may be enabled to identify resources of one or more gift cards that can be used to settle the balance of the transaction. The system may communicate with the backend system associated with the entity to provide gift card information to enable the transaction to be at least partially completed using resources of the gift card. In some implementations, this may enable the resources of the gift card to be used without the user who initiated the transaction presenting any information related to the gift card to the entity when initiating the transaction. In some cases, the user may be completely unaware that the resources of the gift card have been used to at least partially complete a transaction associated with the user.

As a result, the relational database or data store improves the way in which the system stores and manages gift card information by enabling the system to use resources of a gift card to complete transactions without any information associated with the gift card being presented when the transaction is initiated. For example, by using the relational database or data store, backend systems of an entity and/or an institution may be enabled to communicate and/or process transactions that use resources of a gift card differently. Therefore, the system can improve access to data associated with gift cards (e.g., by not requiring that information associated with the gift card be presented when initiating a transaction). Additionally, the system ensures gift card information is presented in a unified manner at a relevant time (e.g., when completing or settling transactions) without requiring that the gift card be identified at the initiation of the transaction, thereby further improving access to the gift card information. Therefore, systems described herein reduce or eliminate the likelihood that the prepaid stored value of the gift card is wasted, because the gift card can be applied to the present transaction (e.g., eliminating a risk that the user forgets to use the gift card or that the gift card is not used before an expiration date).

FIGS. 1A-1E are diagrams of an example 100 associated with database management for stored value mediums (e.g., for gift cards). As shown in FIGS. 1A-1E, example 100 includes a user device, a gift card manager, a transaction device, a transaction terminal, and a transaction backend system. These devices are described in more detail in connection with FIGS. 2 and 3.

As shown in FIG. 1A, and by reference number 102, a gift card holder (e.g., a user who is in possession of or who owns a gift card) may access, via the user device, a gift card tracker platform. The gift card tracker platform may be a web page or an application executing on the user device. The gift card tracker platform may be associated with the gift card manager (e.g., the gift card tracker platform may be provided to the user device by the gift card manager). In some implementations, the gift card tracker platform and/or the gift card manager may be associated with an institution. The institution may provide and/or manage transaction cards and related accounts. For example, the user may be associated with an account and/or transaction card provided by the institution. The gift card tracker platform and/or the gift card manager may enable a gift card provided to the gift card tracker platform and/or the gift card manager to be tracked and/or used by the institution to complete transactions (e.g., even when the gift card is not identified or presented at the initiation of the transaction), as described in more detail below.

In some implementations, the gift card may not be associated with a physical card or physical medium. Therefore, as used herein, "gift card" may refer to stored value resources that can be used to complete transactions at one or more entities. For example, "gift card" may refer to an account balance, a reward point balance, convertible points, store credit, and/or other types of resources that are redeemable or otherwise usable at one or more entities for completing transactions. "Gift card" and "stored value medium" or similar terms may be used interchangeably herein.

In some implementations, the gift card tracker platform may be included in, or may be associated with, a payment application executing on the user device (e.g., a digital wallet application). The gift card tracker platform may display a user interface that enables the gift card owner to input gift card information. Gift card information may include a gift card identifier (e.g., a card number or a credential), a balance (e.g., an amount of a prepaid stored value of the gift card that is remaining), an entity associated with the gift card (e.g., a merchant, vendor, or retailer), and/or expiration information (e.g., an expiration date or an expiration month and year), among other examples. In some implementations, a gift card may be associated with multiple entities or may be generally applicable (e.g., may be capable of being applied at any entity that accepts transactions from an institution associated with the gift card). A transaction may be referred to herein as an exchange, an electronic exchange, a transfer, a sale, a purchase, and/or other similar terms.

In some implementations, the gift card owner may wish to make a gift card available for tracking and/or use by the gift card manager. The gift card owner may input the gift card information associated with the gift card into the gift card exchange platform via the user device. The gift card information may be manually input by the gift card owner or may be obtained by the user device (e.g., by scanning the gift card using a camera of the user device or by communicating with a radio frequency (RF) component, such as a near field communication (NFC) component, of the gift card). For example, as shown in FIG. 1A, gift card information for a gift card may indicate that a gift card identifier (ID) is "1111," a balance is "$50.00," and an entity associated with the gift card is "Store A." As shown in FIG. 1A, the user device may receive an input indicating that the gift card owner desires to make the gift card available on the gift card tracker platform. For example, the user device may receive an input to add the gift card to the gift card tracker platform (e.g., to add the gift card to a database managed by the gift card manager) and/or an input requesting an offer for the gift card, as described in more detail below. In some implementations, the user may input gift card information for multiple gift cards (e.g., associated with multiple entities).

As shown by reference number 104, based on receiving the gift card information, the user device may transmit, to the gift card manager, an indication of the gift card information associated with the gift card. For example, the user device may transmit, and the gift card manager may receive, a gift card identifier (e.g., a card number or a credential), a balance (e.g., an amount of a prepaid stored value of the gift card that is remaining), an entity associated with the gift card (e.g., a merchant, vendor, or retailer), and/or expiration information (e.g., an expiration date or an expiration month and year), among other examples.

As shown by reference number 106, the gift card manager may determine a risk score associated with the gift card. For example, the gift card manager may perform a risk analysis associated with the stored value medium to obtain a risk score for the gift card. The risk score may indicate a risk level associated with enabling transactions that are not associated with the gift card (e.g., transactions that are initiated by another medium, such as a transaction card) to be at least partially completed using the resources associated with the gift card. For example, the risk score may indicate a likelihood that the gift card is fraudulent or that the gift card is stolen or otherwise not validly held by the user who provided the gift card information. In some implementations, the gift card manager may communicate with a device (e.g., a backend system) associated with the entity of the gift card to confirm the validity of the gift card information. For example, the gift card manager may communicate with the device to provide the gift card identifier. The device may transmit, to the gift card manager, an indication of whether the gift card is valid and may indicate a current balance of the gift card. The gift card manager may use the information provided by the device to confirm the validity of the gift card information.

In some implementations, the risk score may indicate a likelihood that the gift card will be able to be used to complete a transaction by the gift card manager. For example, the risk score may indicate that an entity associated with the gift card is not frequently visited or transacted with. Therefore, the risk score may indicate that there is a likelihood that, if the gift card is added to a gift card database by the gift card manager (as explained in more detail below), then the gift card may expire or go unused. For example, the gift card manager may analyze transaction trends or patterns to identify a likelihood of transactions occurring at the entity and/or a frequency of transactions at the entity. In some implementations, the risk score may indicate a likelihood that the gift card will expire before the gift card is able to be used to complete a transaction by the gift card manager. For example, if the expiration date of the gift card is within a threshold amount of time (e.g., from the time the gift card information is provided to the gift card manager), then the gift card manager may determine there is a risk that, if the gift card is added to a gift card database by the gift card manager (as explained in more detail below), then the gift card may expire before the gift card is able to be used to complete a transaction by the gift card manager.

In some implementations, the gift card manager may utilize a machine learning model to obtain the risk score. The machine learning may be trained using a set of observations. The set of observations may be obtained from training data (e.g., historical data), such as data gathered during one or more processes described herein. In some implementations, the machine learning system may receive the set of observations (e.g., as input) from the gift card manager. For example, the gift card manager may input the gift card information (e.g., the gift card identifier, the balance, the entity associated with the gift card, and/or expiration information), and/or entity information (e.g., entity location, previous transaction information associated with the entity), among other examples. A target variable value for the machine learning model may be the risk score. For example, the machine learning model may output the risk score associated with the gift card.

As shown by reference number 108, the gift card manager may determine whether to store the gift card in the gift card database (e.g., as described in more detail below) and/or may determine an offer for the gift card based at least in part on the risk score. For example, in some implementations, the gift card manager may populate the gift card database with the gift card information to enable the gift card manager to track the gift card information and/or to use resources of the gift card manager to complete transactions. In one implementation, ownership of the gift card may remain with the user who provided the gift card information and the gift card database may be used to improve access to the resources of the gift card for the user, as explained in more detail below (e.g., the gift card manager may only apply resources of the gift card to transactions associated with the user). In a variety of implementations, the gift card manager may provide an offer for the gift card to the user. If the offer is accepted, then the gift card manager may populate the gift card information in a relational database associated with the entity. Therefore, the gift card manager may apply resources of the gift card to any transactions associated with the entity (e.g., even if a user associated with the transaction is not associated with the gift card).

In some implementations, if the risk score satisfies a threshold, then the gift card manager may determine that the gift card should not be added to the gift card database. For example, the gift card manager may determine (e.g., based on the risk score) that the gift card is fraudulent, not valid, and/or is unlikely to be used. Therefore, the gift card manager may not add the gift card information to the gift card database and/or may not generate an offer (or may generate a lower offer, as described in more detail below) for the gift card. By performing the risk analysis associated with the gift card as described herein, the gift card manager may ensure that fraudulent gift cards, gift cards that are not valid, and/or gift cards that are unlikely to be used are not added to a database, as described below. In this way, the gift card manager may improve security by ensuring that only valid gift cards are added to the gift card database. Additionally, the gift card manager may conserve resources (e.g., processing resources and/or memory resources) that would have otherwise been used to add and/or store information associated with fraudulent gift cards, gift cards that are not valid, and/or gift cards that are unlikely to be used in the gift card database.

As described above, in some implementations, the gift card manager may generate an offer for the gift card based on the gift card information and/or the risk score, among other examples. In some implementations, rather than a monetary offer, the gift card manager may generate an offer for reward points or credit that can be redeemed at multiple entities (e.g., multiple merchants or retailers). For example, the gift card manager may be associated with an institution that provides reward points or credit that can be redeemed at multiple entities. The gift card manager may generate an offer for reward points or credit to be applied to an account of the gift card owner associated with the institution.

For example, the gift card manager may generate an offer for the gift card based on the balance of the gift card. In some implementations, the offer may be equal to the balance of the gift card (e.g., $50.00). In some implementations, the offer may be less than the balance of the gift card (e.g., a nominal amount less than the balance of the gift card, such as $45 as shown in FIG. 1A). In some implementations, the offer may be a percentage or portion of the balance of the gift card (e.g., 98% of the balance of the gift card). In some implementations, the offer may be based on the entity associated with the gift card. For example, the gift card manager may generate a higher offer for a gift card having a balance and associated with a certain entity when compared to a different gift card having the same balance and associated with a different entity. For example, the gift card manager may generate a higher offer for gift cards associated with entities that are frequently visited or transacted with. The gift card manager may analyze historical transaction information or historical sales of gift cards by the gift card manager to identify one or more entities that are frequently visited or frequently transacted with. The gift card manager may generate a higher offer for gift cards associated with the one or more identified entities because the gift card manager may have a higher likelihood of selling the gift cards to purchasers (e.g., because the one or more entities are frequently visited with or frequently transacted with).

In some implementations, the gift card manager may generate the offer based on the risk score associated with the gift card, as described above. For example, if the risk score indicates a high risk associated with the gift card (e.g., if the risk score satisfies a threshold), then the gift card manager may generate a lower offer for the gift card (e.g., $40 offer for a gift card with a $50 balance) than an offer if the risk score indicates a low risk (e.g., if the risk score does not satisfy the threshold) associated with the gift card (e.g., a $45 offer for the gift card with the $50 balance).

In some implementations, as shown by reference number 110, the gift card manager may transmit, to the user device, an indication of the offer for the gift card. For example, the gift card manager may provide instructions to the user device to provide the offer for display via the user device (e.g., via a web page or application executing on the user device associated with the gift card manager). As shown in FIG. 1A, the user device may provide an offer of $45 for display (e.g., via a user interface being displayed by the user device) for the gift card input by the gift card owner. In some implementations, the gift card owner may accept the offer by providing an input to the user interface being displayed by the user device. For example, the user device may receive the input indicating an acceptance of the offer. The user device may transmit, to the gift card manager, an indication that the offer for the gift card has been accepted. In some implementations, upon receiving the indication that the offer for the gift card has been accepted, the gift card manager may cause an account associated with the gift card owner to be credited with the value (e.g., the monetary value) of the offer. Based at least in part on receiving the indication that the offer for the gift card has been accepted, the gift card manager may populate a gift card database with the gift card information, as described in more detail below.

In some implementations, the gift card manager may allow a stored value medium (e.g., a gift card) to be exchanged for another medium. For example, an institution associated with the gift card manager may provide a payment medium (e.g., a transaction card or a credit to an account associated with the user) in exchange for the stored value medium (e.g., the gift card). In some implementations, the payment medium may be specific to the entity (e.g., the merchant or the vendor) associated with the gift card. For example, a transaction card or a credit to an account associated with the user may be associated with the institution of with the gift card manager and may only be capable of being applied to transactions with the entity (e.g., the merchant or the vendor) associated with the gift card. This may enable the user to use resources of the payment medium to complete transactions with the entity, without having to rely on using or identifying the gift card to complete the transactions.

In this way, the user may conduct transactions, using resources of the payment medium (e.g., the transaction card or the credit to an account associated with the user) that were exchanged for the resources of the gift card, at the entity (e.g., the merchant or the vendor) associated with the gift card (e.g., without having to present or identify the gift card). As a result, backend systems may be enabled to process the transaction as a credit or debit transaction (e.g., rather than a gift card transaction), enabling the backend system use resources of a stored value medium to settle transactions initiated using another medium. For example, the stored value medium (e.g., the gift card) may be added to a gift card database and may be used by the gift card manager to settle transactions (e.g., transactions associated with the user and/or other transactions) on the backend, as described in more detail below.

Figure 1B:
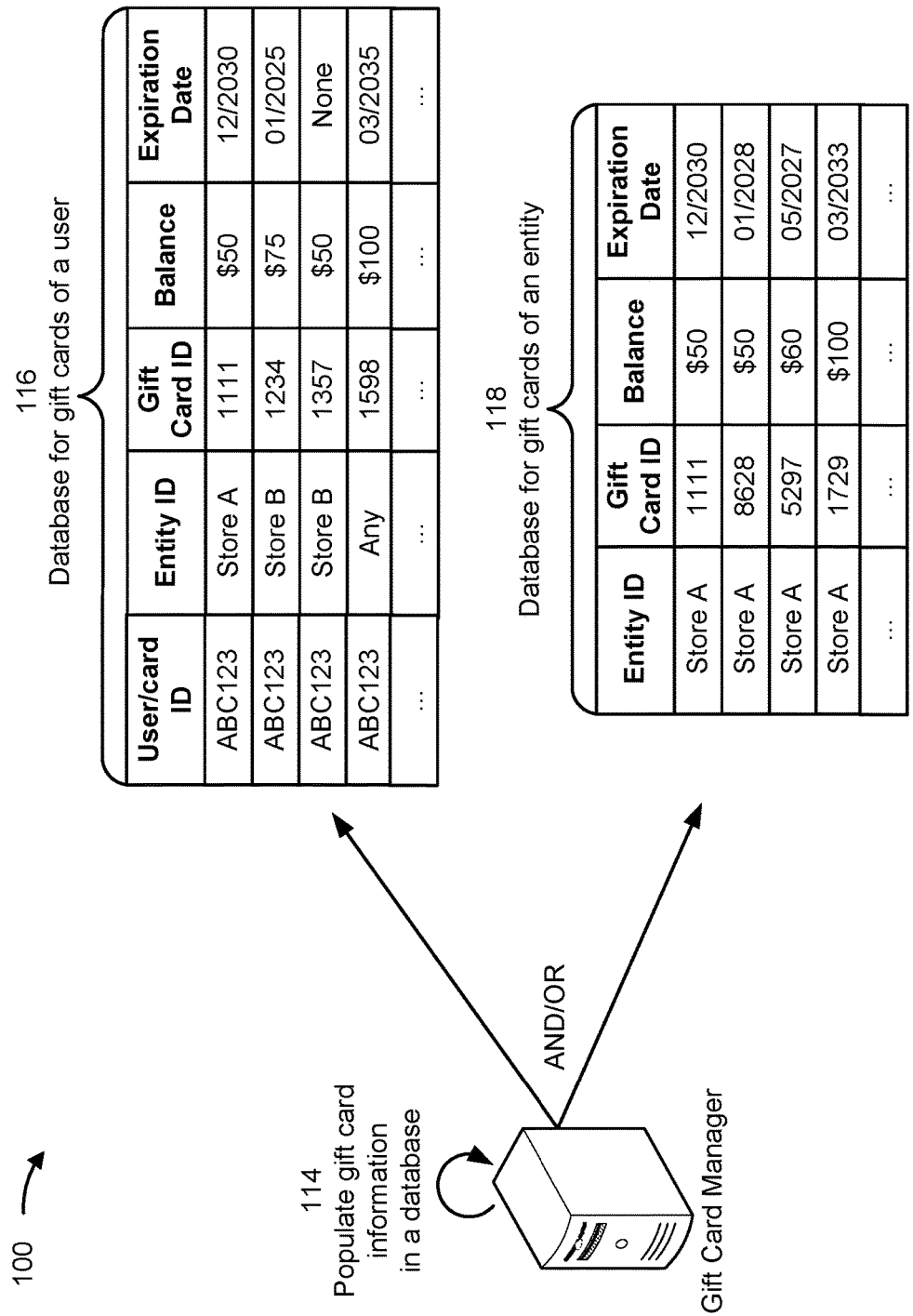

As shown in FIG. 1B, and by reference number 114, the gift card manager may populate one or more databases (e.g., one or more gift card databases) with gift card information. The gift card databases may be relational databases to link the gift card information with a specific user (e.g., a user identifier) and/or a specific entity (e.g., an entity identifier). In some implementations, as shown by reference number 116, a gift card database may be associated with a user (e.g., may be a user gift card database). The user gift card database may be a table to link gift card information (e.g., provided by the user or a user device associated with the user) to a user identifier (e.g., a unique identifier that identifies the user). In some implementations, the user gift card database may link gift card information to another medium, such as a transaction card, associated with the user (e.g., the user gift card database may link gift card information to a transaction card identifier of a transaction card associated with the user). As a result, the gift card manager may be enabled to use the user gift card database to complete transactions (e.g., transactions initiated using the transaction card linked to the gift card information) using resources of one or more gift card(s) identified in the user gift card database, as explained in more detail below.

As shown in FIG. 1B, the user gift card database may identify a user identifier, a transaction card identifier, an entity (e.g., merchant or vendor) identifier, a gift card identifier, a balance, and/or expiration information (e.g., an expiration date or an expiration month and year), among other examples. In some implementations, the gift card manager may populate the gift card information into a user gift card database when the user retains ownership of the gift card, as described above. As shown in FIG. 1B, a user gift card database may identify gift card information associated with multiple entities (e.g., and a single user).

In some implementations, as shown by reference number 118, a gift card database may be associated with an entity (e.g., may be an entity gift card database). For example, an entity gift card database may identify gift card information for multiple gift cards that are associated with the same entity (e.g., and different users). For example, the entity gift card database may be a table to link gift card information to an entity identifier associated with the entity. In some implementations, the gift card manager may populate the gift card information into an entity gift card database when the user accepts an offer from the gift card manager for the gift card, as described in more detail above. In some implementations, the gift card manager may populate the gift card information into an entity gift card database when the user retains ownership of the gift card and may credit the user for a value (e.g., a value corresponding to a value of the offer) of the gift card when the resources of the gift card are used by the gift card manager, as explained in more detail below. As a result, the gift card manager may be enabled to use the entity gift card database to complete transactions (e.g., any transactions associated with the entity and the institution associated with the gift card manager) using resources of one or more gift cards identified in the entity gift card database, as explained in more detail below.

In some implementations, rather than maintaining separate entries for each gift card in the entity gift card database, the gift card manager may aggregate balances of a gift cards into a single account associated with the entity. For example, the gift card manager may receive gift card information and may determine that the gift card information is to be linked to an entity (e.g., rather than to a specific user). The gift card manager may communicate with a backend system associated with the entity to redeem or add a balance of the gift card to a gift card account at the entity associated with the institution (e.g., the institution that is associated with the gift card manager). Therefore, when the gift card manager settles or completes transactions associated with the entity, the gift card manager may use a balance of the gift card account associated with the entity to complete the transaction(s).

Figure 1C:
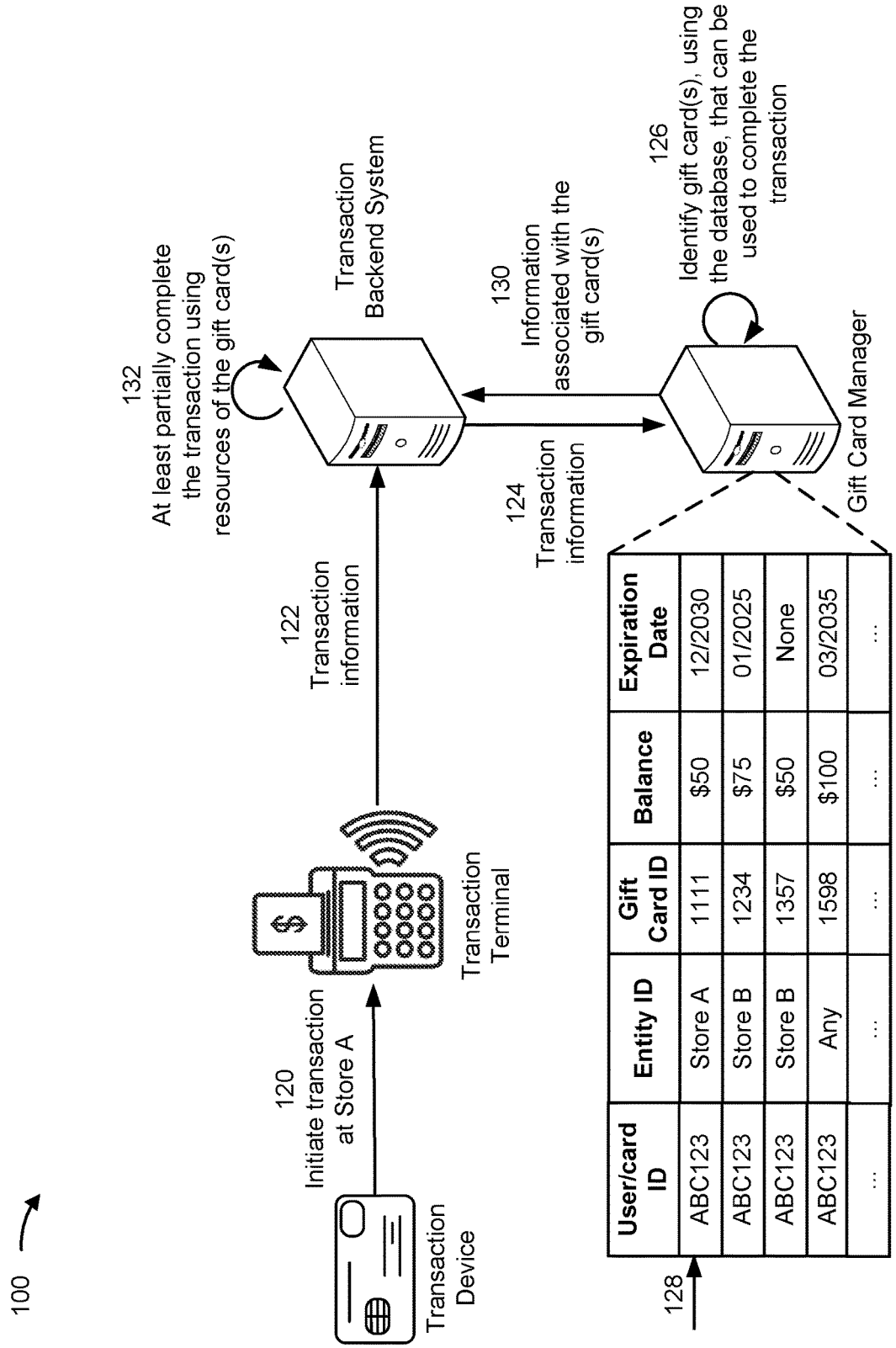

As shown in FIG. 1C, a transaction may be initiated that is associated with an entity (e.g., Store A, as shown in FIG. 1C). For example, as shown by reference number 120, a transaction device (such as a transaction card) may be used to initiate the transaction with a transaction terminal associated with the entity. In some implementations, the transaction terminal may be located at a physical location associated with the entity. In other implementations, the transaction terminal may be associated with an online or electronic platform of the entity (e.g., the transaction device may be used to initiate a transaction using a website associated with the entity). As described above, the transaction device may be a different medium (e.g., a different card or device) than one or more gift cards stored in the gift card database(s) described above. For example, the transaction device may be associated with a different institution or entity than the entity associated with a gift card. In some implementations, the transaction device may be associated with the same institution as the gift card manager.

As shown by reference number 122, the transaction terminal may transmit, to a transaction backend system, transaction information associated with the transaction. For example, the transaction information may include an amount of the transaction, an identifier associated with the transaction device, a date of the transaction, a time of the transaction, and/or a location of the transaction, among other examples. As shown by reference number 124, the transaction backend system may transmit, to the gift card manager (or another device associated with the gift card manager) an indication of the transaction information. For example, the transaction backend system may communicate with the gift card manager (or another device associated with the gift card manager) to obtain approval for completing the transaction.

In some implementations, the transaction backend system may communicate with a backend system associated with the gift card manager to obtain approval for completing the transaction. For example, the backend system associated with the gift card manager may determine whether an account associated with the transaction device has sufficient resources (e.g., a sufficient account balance or remaining credit limit) to complete the transaction. The backend system associated with the gift card manager may provide an approval or a rejection of the transaction to the transaction backend system (e.g., in near real time) to enable the transaction backend system to complete the transaction without significant delays. The backend system associated with the gift card manager may communicate with the gift card manager to settle or complete the transaction using resources associated with one or more gift cards (e.g., after the transaction backend system approves the transaction for the user), as described in more detail below. Alternatively, the transaction backend system may communicate directly with the gift card manager to obtain approval for completing the transaction, as described above.

As shown by reference number 126, the gift card manager may identify one or more gift cards that can be used to complete or settle the transaction. For example, the gift card manager may use one or more of the gift card databases to identify one or more gift cards that can be used to complete or settle the transaction. The gift card manager may identify the one or more gift cards based on the transaction information. For example, the gift card manager may identify a user identifier (associated with the user who initiated the transaction) or a transaction device identifier (associated with the transaction device that initiated the transaction) associated with the transaction. The gift card manager may search or parse one or more gift card databases to identify a user gift card database associated with the user identifier and/or the transaction device identifier. The gift card manager may search for a user gift card database associated with the user identifier or the transaction device identifier.

The gift card manager may identify, in a user gift card database, one or more relevant gift cards based on the transaction information. A relevant gift card may be a gift card that can be applied to settle or complete an amount of the transaction at the entity indicated by the transaction information, a gift card that has a similar balance as a transaction amount indicated by the transaction information, and/or is active or not expired. The gift card manager may search, sort, and/or parse the user gift card database to identify gift cards associated with, or that can be used at, the entity indicated by the transaction information. For example, as shown by reference number 128, the gift card manager may identify gift cards in the user gift card database associated with Store A (e.g., associated with an identifier indicating Store A). In some implementations, in addition to identifying gift cards in the user gift card database associated with Store A, the gift card manager may identify gift cards in the gift card database that can be used at multiple entities (including Store A) or at any entity.

From the set of gift cards associated with the entity indicated by the transaction information (or capable of being applied at any entity), the gift card manager may identify one or more relevant cards based on the transaction amount indicated by the transaction information. In some implementations, the gift card manager may identify available gift cards, from the set of available gift cards associated with the entity (e.g., Store A or capable of being applied at any entity), that have a balance equal to or less than the transaction amount indicated by the transaction information (e.g., to enable the user to use the entire balance of the gift card for the transaction so that the user is not left with a gift card having a balance). In some implementations, the gift card manager may identify available gift cards, from the set of available gift cards associated with the entity (e.g., Store A), that have a balance equal to or greater than the transaction amount indicated by the transaction information (e.g., to enable the user to complete the transaction using only the gift card). In the example where the gift card manager identifies available gift cards that have a balance equal to or greater than the transaction amount, the gift card manager may retain the gift card in the user gift card database with an updated balance (e.g., after the gift card is applied to the transaction).

If the gift card manager identifies multiple relevant gift cards (e.g., from the set of available gift cards associated with the entity, based on the transaction amount), then the gift card manager may select a relevant gift card, from the multiple relevant gift cards, based on which gift card, in the multiple relevant gift cards, has a balance that is closest to the transaction amount indicated by the transaction information. In some implementations, if multiple relevant gift cards have the same balance and have the balance closest to the transaction amount, then the gift card manager may select a relevant gift card based on an amount of time that each gift card has been stored in the user gift card database. For example, the gift card manager may select the gift card that has been stored in the gift card database for the most amount of time (e.g., of the multiple relevant gift cards) in a first-in-first-out manner. In other words, if the gift card manager identifies multiple relevant gift cards based on the transaction information, then the gift card manager may select the gift card that was first added to the gift card database. In some implementations, the gift card manager may select a relevant gift card based on an expiration date. For example, if multiple relevant gift cards have the same balance and have the balance closest to the transaction amount, then the gift card manager may select a relevant gift card based on which gift card, of the multiple relevant gift cards, is to expire first. The gift card manager may select the gift card, from the multiple relevant gift cards, that expires first.

In some implementations, the gift card manager may identify multiple gift cards to be used to complete or settle the transaction. For example, an amount of the transaction may be greater than a balance of any one gift card associated with the entity (e.g., that is identified in the user gift card database). However, there may be multiple gift cards associated with the entity that are identified in the user gift card database. Therefore, the gift card manager may determine that the multiple gift cards may be used to complete or settle an amount of the transaction.

In some implementations, the gift card manager may identify an entity gift card database based on an entity identifier associated with the transaction. For example, the gift card manager may search or parse one or more gift card databases using an entity identifier associated with the entity to identify the entity gift card database associated with the entity. The gift card manager may identify one or more relevant gift cards identified in the entity gift card database in a similar manner as described above. Therefore, in some implementations, the gift card manager may identify a gift card to be used to complete or settle a transaction at the entity that is unrelated to, or not owned by, a user associated with the transaction. In some implementations, the gift card manager may identify a gift card account associated with the entity (e.g., that is associated with an aggregated balance of multiple gift cards associated with the entity, as described above). The gift card manager may identify an identifier associated with the gift card account to enable the gift card manager to use the gift card account to settle or complete transactions associated with the entity.

As shown by reference number 130, the gift card manager may transmit, to the transaction backend system, information associated with the identified gift cards or gift card account to enable resources of gift cards stored in the gift card database(s) to be used to complete or settle transactions at the entity. For example, the gift card manager may transmit gift card information for one or more gift cards identified in the gift card database(s), as described above. In some implementations, the gift card manager may transmit an identifier of a gift card account associated with entity and the gift card manager. In some implementations, the gift card manager may transmit the information associated with the identified gift cards or gift card account to settle or complete a transaction (e.g., the transaction described above). In some implementations, the gift card manager may transmit the information associated with the identified gift cards or gift card account to settle or complete multiple transactions associated with the entity. For example, the transaction backend system may communicate with the gift card manager (or another device associated with the gift card manager) to settle multiple transactions (e.g., in a batch processing manner). The gift card manager may transmit the information associated with the identified gift cards or gift card account to at least partially complete or settle a balance of the multiple transactions.

As shown by reference number 132, the transaction backend system may at least partially complete the transaction (or the multiple transactions) using resources of one or more gift cards identified by the gift card manager. For example, the transaction backend system may apply a prepaid balance of one or more gift cards to a balance of the transaction (or the multiple transactions). In this way, the transaction backend system may be enabled to use resources of a gift card to complete or settle a transaction without any information associated with the gift card being presented at the time of the transaction.

In some implementations, the gift card manager (or another device associated with the gift card manager) may refrain from charging or applying an amount to an account associated the transaction device. For example, the transaction may be for an amount of $40. The transaction backend system may approve the transaction based on receiving an indication that an account associated with the transaction device has a sufficient balance or credit limit to complete a transaction for $40. However, as described above, rather than entirely using resources associated with the account to settle or complete the transaction, the gift card manager may use resources of an identified gift card to at least partially complete or settle the transaction. For example, the gift card manager may use the gift card in the user gift card database (e.g., shown by reference number 128) to complete or settle the transaction. As the gift card has a $50 balance, the resources of the gift card may be used (e.g., by the gift card manager and/or the transaction backend system) to completely settle the transaction. Therefore, the gift card manager (or another device associated with the gift card manager) may refrain from charging or applying the $40 amount to the account associated with the transaction device. In some implementations, the transaction information may still be added to a record or ledger associated with the account (e.g., to enable a user to identify the transaction), but resources of the account may not be reduced as the gift card manager and/or the transaction backend system used resources of the gift card to settle the transaction.

In some implementations, the gift card manager (or another device associated with the gift card manager) may apply the transaction to a payment medium (e.g., a transaction card or an account) that was exchanged for the gift card, as described above. For example, the gift card manager may maintain a record or database of resources of the payment medium that are based on the stored value resources of the gift card. The gift card manager may deduct an amount of the transaction from the resources of the payment medium.

In some implementations, no indication may be provided to an account associated with the transaction device that resources of a gift card were used to complete or settle a transaction associated with the gift card. For example, the gift card manager (or another device associated with the gift card manager) may charge or apply an amount of the transaction to the account associated with the transaction device as normal (e.g., as if resources associated with the account were entirely used to complete or settle the transaction). However, on the backend, the gift card manager and/or the transaction backend system may coordinate to use resources associated with one or more gift cards to complete or settle the transaction, as described above.

Figure 1D:
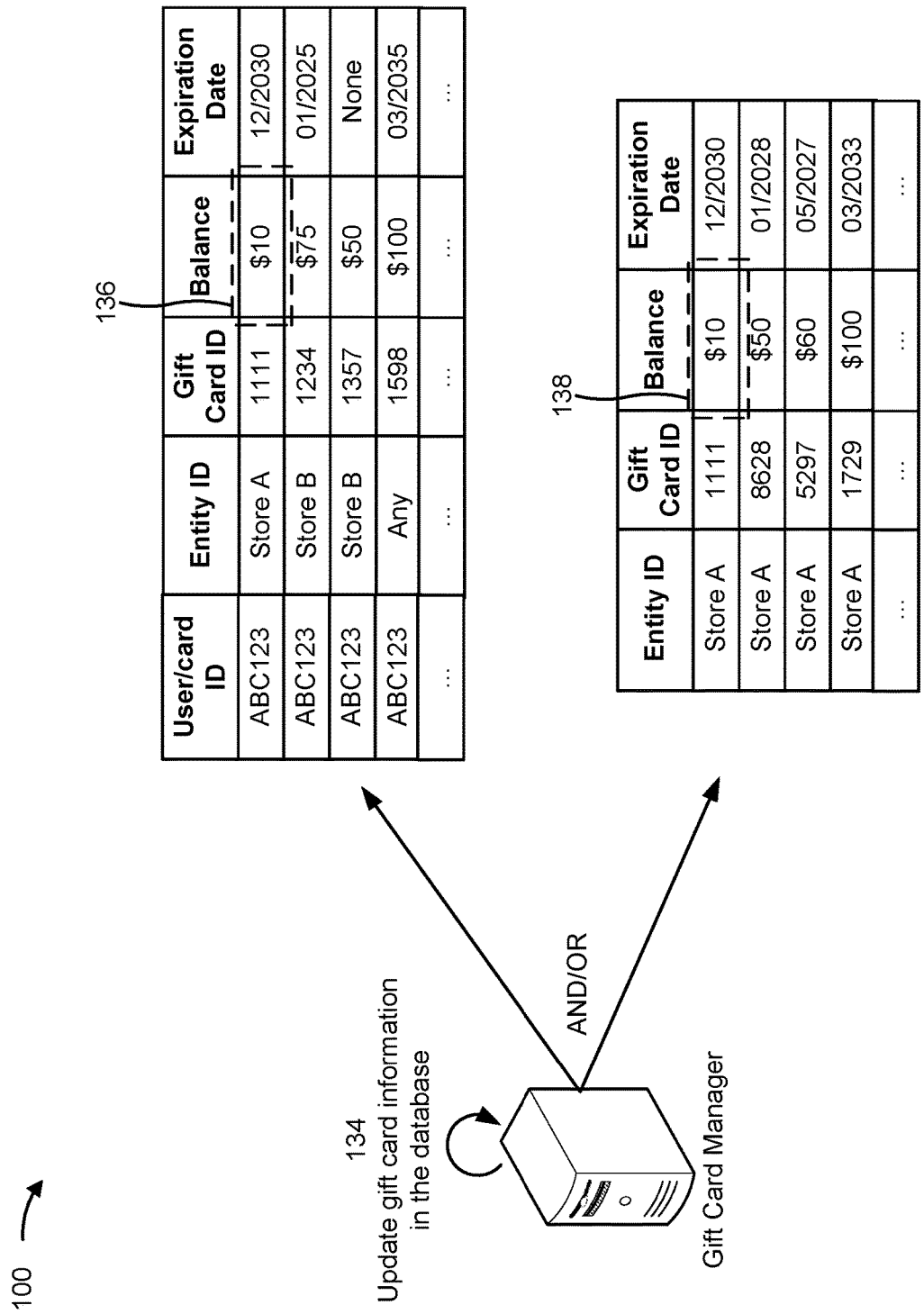

As shown in FIG. 1D, and by reference number 134, the gift card manager may update gift card information stored in the gift card database(s). For example, the gift card manager may determine an updated balance associated with a gift card after enabling a transaction to be at least partially completed using the resources associated with the gift card. The gift card manager may update an entry included in the gift card database(s) associated with the gift card to reflect the updated balance of the gift card. In some implementations, as described above, the gift card manager may identify an indication (or a trigger) to update the gift card information associated with a gift card stored in the gift card database(s). For example, the indication (or the trigger) may include that the transaction has been at least partially completed using the resources associated with the gift card, that another transaction has been completed using the resources associated with the gift card (e.g., that a user has used the gift card to complete a transaction separate from the gift card manager), and/or that an expiration date of the gift card has expired, among other examples.

For example, the gift card manager may monitor and/or update gift card information identified in the gift card database(s) (e.g., the user gift card database and/or the entity gift card database). For example, the gift card manager may receive an indication of, or identify, an updated balance of an available gift card (e.g., based on a user using the available gift card to complete a transaction). The gift card manager may identify an entry associated with the gift card in a gift card database and may update the balance identified in the entry. In some implementations, the gift card manager may monitor (e.g., periodically) a balance of each gift card identified in the gift card database(s) by communicating with a backend system associated with a (or each) gift card identified in the gift card database(s). For example, the gift card manager may communicate with the backend system to request and/or receive an indication of a current balance of the gift card. If an updated balance indicates that there is no balance left (e.g., a $0 balance) associated with a gift card, then the gift card manager may remove the gift card from the gift card database (e.g., may remove or delete an entry associated with the gift card from the gift card database).

Additionally, or alternatively, the gift card manager may monitor (e.g., periodically, such as once a month or once a week) expiration information indicated in the gift card database to identify any expired gift cards. The gift card manager may remove expired available gift cards from the gift card database (e.g., may remove or delete an entry associated with the expired available gift cards from the gift card database). In this way, the gift card manager may ensure that gift card information indicated in the gift card database(s) is accurate and current. Moreover, this may conserve memory resources associated with storing the gift card database by removing gift card information for expired gift cards and/or gift cards with no remaining balance. Additionally, the real-time nature of the exchange (e.g., based on a current balance of a gift card) may reduce a likelihood of fraud. For example, by storing the remaining balance of a gift card, identifying the gift card as relevant to a transaction, and simultaneously completing transactions using the gift card (e.g., as described in more detail below) a likelihood of fraud is reduced due to the real-time nature of the transaction.

For example, as shown by reference numbers 136 and 138, the gift card manager may update a balance of a gift card that has been used to complete or settle a transaction. For example, as described above, the gift card associated with the identifier of "1111" may be used to complete a transaction that was initiated by the transaction device, as described above. The transaction amount may be $40.

Therefore, the gift card manager may update or modify an entry (e.g., in one or more gift card databases) associated with a balance of the gift card to reflect an updated balance (e.g., $10, from the previous balance of $50). In this way, the gift card manager may ensure that data stored by the gift card manager is accurate and up to date.

Figure 1E:
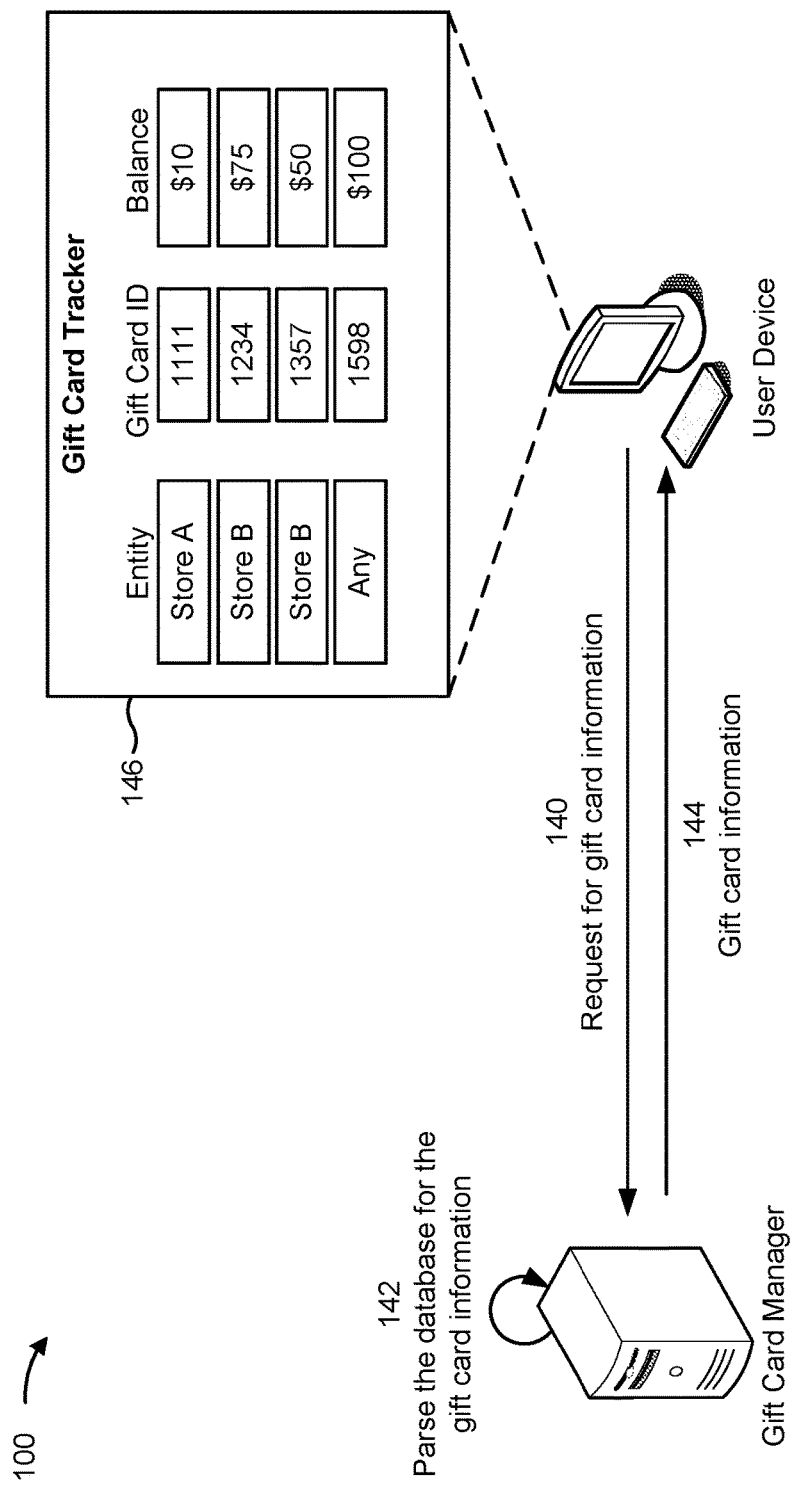

As shown in FIG. 1E, in some implementations, the gift card manager may provide updated gift card information to the user device. For example, as shown by reference number 140, the gift card manager may receive, from the user device, a request associated with current information associated with one or more gift cards. For example, a user may use the gift card tracker platform (e.g., described above) to access information associated with gift cards that have been added to the gift card tracker platform and/or the gift card database(s). For example, because the resources of the gift cards may be used by the gift card manager without explicit knowledge of the user or without the user presenting the gift card at a transaction terminal, the user may be unaware of a current balance of the gift card. Therefore, the user may access the user device to obtain current or updated information for gift cards that have been added to the gift card tracker platform and/or the gift card database(s).

As shown by reference number 142, the gift card manager may search or parse one or more gift card databases to identify the current gift card information identified in the one or more gift card databases. For example, the gift card manager may search for a user gift card database associated with the user or the user device. The gift card manager may identify, in the gift card database (e.g., the user gift card database), current information associated with one or more gift cards. In some implementations, the current information may include an updated balance associated with a gift card after the gift card manager has enabled a transaction to be at least partially completed using the resources associated with the gift card, as described above. As shown by reference number 144, the gift card manager may transmit, to the user device, an indication of the current information associated with the one or more gift cards.

For example, the gift card manager may cause a message to be transmitted to the user device or may cause an application executing on the user device to display a notification indicating current information associated with the one or more gift cards. As shown by reference number 146, the user device may display the current information associated with the one or more gift cards. For example, the user device may display gift card information associated with the gift cards associated with the user that are stored in the gift card database(s). As shown in FIG. 1E, the user device may display an updated balance of a gift card that was used to complete or settle a transaction by the gift card manager (e.g., the updated balance of $10 for the gift card with the identifier of "1111"). In this way, the gift card owner may be notified of and/or may access the current information associated with the one or more gift cards and may use the current information to make decisions regarding potential future transactions. In this way, the gift card manager makes gift card data easier to access by enhancing a user interface, thereby improving a user experience, and enhancing user-friendliness of a user device and the user interface. In some implementations, the gift card information is presented in a unified manner at a relevant time via the user interface (as opposed to a scenario where gift card information is presented on separate web pages of different platforms, required the user to navigate multiple devices and/or multiple webpages to access the current information for the one or more gift cards), thereby further improving access to the gift card information.

As indicated above, FIGS. 1A-1E are provided as an example. Other examples may differ from what is described with regard to FIGS. 1A-1E.

Figure 2:
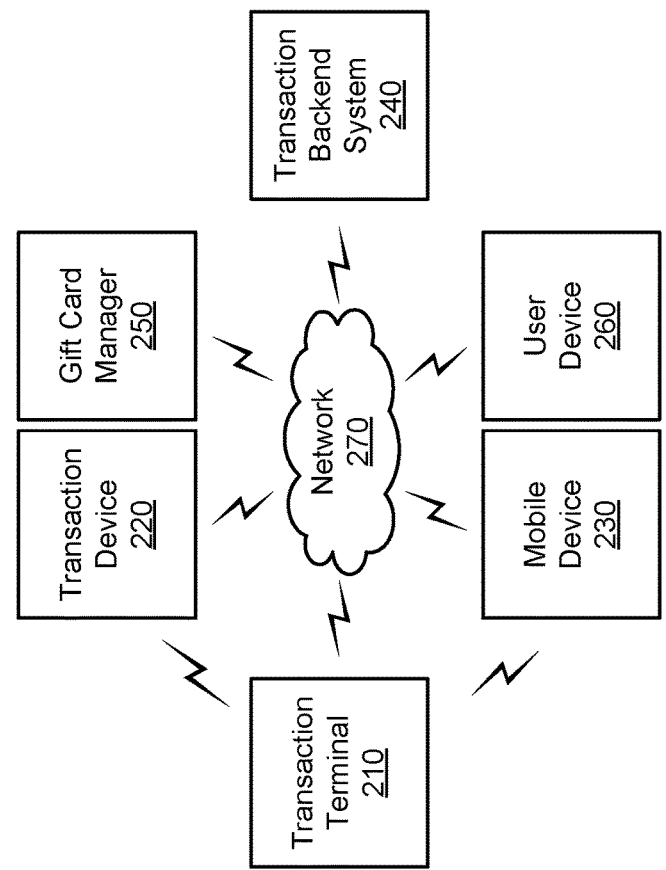
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a mobile device 230, a transaction backend system 240, a gift card manager 250, a user device 260, and/or a network 270. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with (or without) integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The mobile device 230 includes one or more devices capable of being used for an electronic transaction, as described above in connection with the transaction device 220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The gift card manager 250 includes one or more devices capable of receiving, generating, storing, processing, providing, and/or routing information associated with database management for stored value mediums (e.g., for gift cards), as described elsewhere herein. The gift card manager 250 may include a communication device and/or a computing device. For example, the gift card manager 250 may include a server, such as an application server, a client server, a web server, a database server, a host server, a proxy server, a virtual server (e.g., executing on computing hardware), or a server in a cloud computing system. In some implementations, the gift card manager 250 includes computing hardware used in a cloud computing environment.

The user device 260 includes one or more devices capable of receiving, generating, storing, processing, and/or providing information associated with database management for stored value mediums (e.g., for gift cards), as described elsewhere herein. The user device 260 may include a communication device and/or a computing device. For example, the user device 260 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 270 includes one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
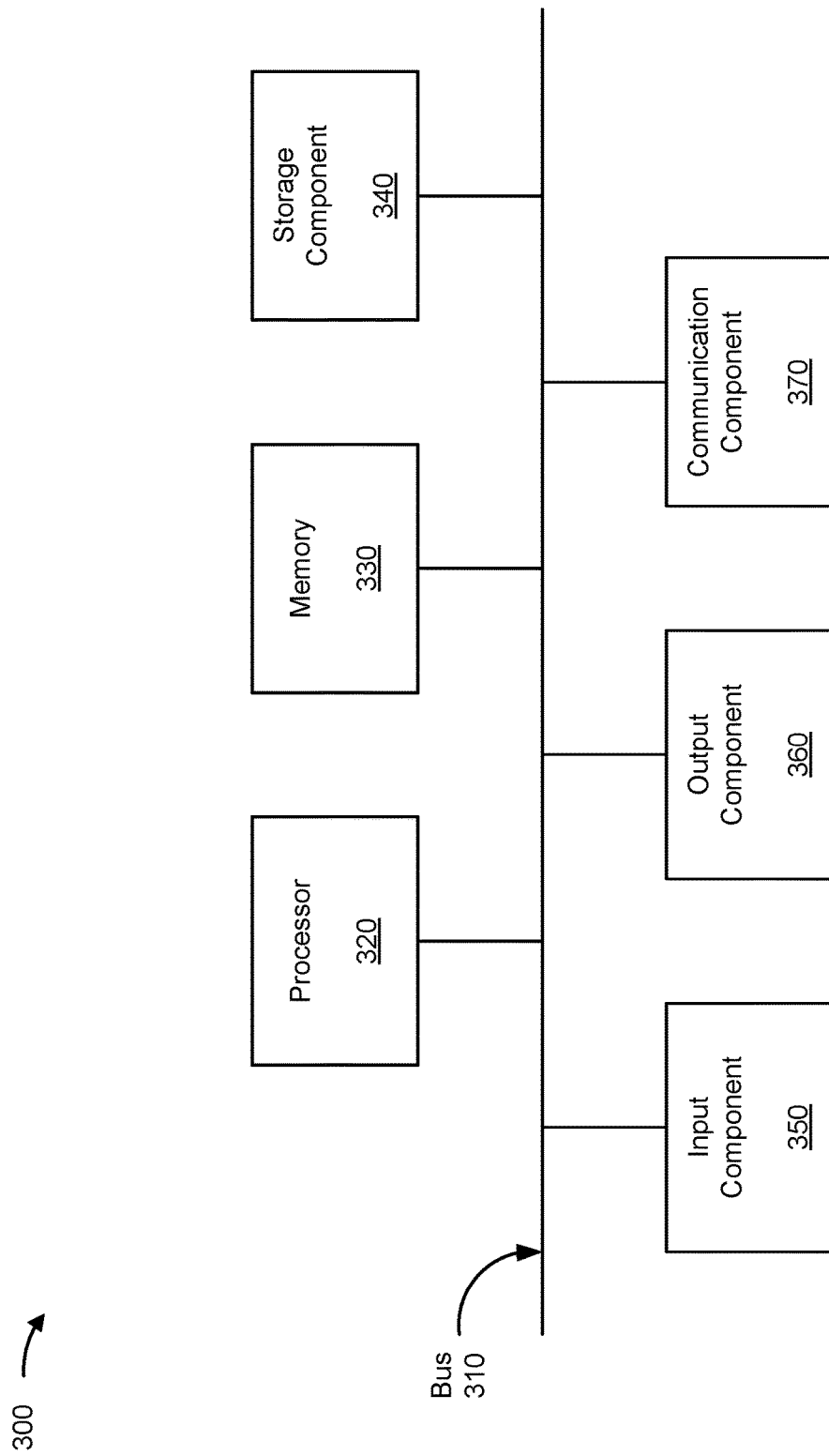
FIG. 3 is a diagram of example components of one or more devices of FIG. 2.

FIG. 3 is a diagram of example components of a device 300, which may correspond to the transaction terminal 210, the transaction device 220, the mobile device 230, the transaction backend system 240, the gift card manager 250, and/or the user device 260. In some implementations, the transaction terminal 210, the transaction device 220, the mobile device 230, the transaction backend system 240, the gift card manager 250, and/or the user device 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna, among other examples.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with database management for stored value mediums (e.g., for gift cards). In some implementations, one or more process blocks of FIG. 4 may be performed by a device (e.g., the gift card manager 250). In some implementations, one or more process blocks of FIG. 4 may be performed by another device or a group of devices separate from or including the device, such as the transaction terminal 210, the transaction device 220, the mobile device 230, the transaction backend system 240, and/or the user device 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an indication of information associated with a stored value medium, wherein the information includes a balance of resources associated with the stored value medium and an identifier of the stored value medium (block 410). As further shown in FIG. 4, process 400 may include populating the database with the information associated with the stored value medium, wherein the database includes a table to link the information associated with the stored value medium with an entity identifier of an entity associated with the stored value medium (block 420). As further shown in FIG. 4, process 400 may include receiving an indication of an exchange associated with the entity identifier of the entity, wherein the indication of the exchange includes an amount of the exchange, and wherein the exchange is not associated with the stored value medium (block 430). As further shown in FIG. 4, process 400 may include parsing the database using the entity identifier associated with the entity to identify the information associated with the stored value medium indicated in the database (block 440). As further shown in FIG. 4, process 400 may include communicating, with a backend system associated with the exchange, to enable the exchange to be at least partially completed using the resources associated with the stored value medium based on searching the database to identify the information associated with the stored value medium (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The foregoing disclosure provides illustration and description, but is not intended to be exhaustive or to limit the implementations to the precise forms disclosed. Modifications may be made in light of the above disclosure or may be acquired from practice of the implementations. Accordingly, the scope of the invention should be determined not by the embodiments illustrated, but by the appended claims and their equivalents.

What is claimed is:

1. A system for managing a data store for stored value mediums, the system comprising:
   one or more memories; and
   one or more processors, coupled to the one or more memories, configured to:
      receive an indication of information associated with a stored value medium associated with an entity, wherein the information includes a balance of resources associated with the stored value medium and an identifier of the stored value medium;
      perform a risk analysis associated with the stored value medium to obtain a risk score for the stored value medium;
      populate the data store with the information based on the risk score for the stored value medium, wherein the data store includes a table to link the information with an entity identifier of the entity associated with the stored value medium;
      receive an indication of an exchange associated with the entity, wherein the exchange is associated with another medium that is distinct and separate from the stored value medium;
      search the data store using the entity identifier to identify an aggregated balance of resources corresponding to a single account associated with the entity; and
      communicate, with a backend system, to enable the exchange to be at least partially completed using the aggregated balance of resources.

2. The system of claim 1, wherein the one or more processors are further configured to:
   transmit, to a user device, a user interface for display by the user device, wherein the user interface enables the one or more processors to receive information associated with the stored value medium and to link the information associated with the stored value medium to the entity identifier of the entity; and
   wherein the one or more processors, to receive the indication of the information associated with the stored value medium, are configured to:
      receive, from the user device, the indication of the information associated with the stored value medium that is input to the user device via the user interface.

3. The system of claim 1, wherein the one or more processors are further configured to:
   determine an updated balance associated with the stored value medium after enabling the exchange to be at least partially completed using the aggregated balance of resources; and
   update an entry associated with the at least one stored value medium to reflect the updated balance of the stored value medium.

4. The system of claim 1, wherein the one or more processors are further configured to:
   receive, from a user device, a request associated with current information associated with the stored value medium;
   identify the current information associated with the stored value medium, wherein the current information includes an updated balance associated with the stored value medium after enabling the exchange to be at least partially completed using the aggregated balance of resources; and
   transmit, to the user device, a user interface for display by the user device that indicates the current information associated with the stored value medium.

5. The system of claim 1, wherein the data store comprises a first data store, and wherein the one or more processors are further configured to:
   identify an indication to update the information associated with a plurality of stored value mediums included in a second data store, wherein the plurality of stored value mediums includes the stored value medium associated with the identifier; and
   update an entry included in the second data store, the entry being associated with the information associated with the plurality of stored value mediums, wherein updating the entry includes modifying information indicated by the entry or removing the entry from the second data store.

6. The system of claim 5, wherein the one or more processors, to identify the indication to update the information, are configured to:
   identify at least one of:
      that the exchange has been at least partially completed using the aggregated balance of resources,
      that an exchange has been completed using the aggregated balance of resources, or
      that an expiration date of the stored value medium has expired.

7. The system of claim 1, wherein the risk score indicates a risk level associated with enabling exchanges that are not associated with the stored value medium to be at least partially completed using the aggregated balance of resources; and
   wherein the one or more processors, to populate the data store, are configured to:
      populate the data store with the information based on the risk score satisfying a threshold; or
      transmit an indication that the stored value medium cannot be stored in the data store when the risk score does not satisfy the threshold.

8. The system of claim 1, wherein the one or more processors, to communicate with the backend system to enable the exchange to be at least partially completed using the aggregated balance of resources, are configured to:
   transmit, to the backend system associated with the exchange, an indication of the identifier associated with the stored value medium;

receive, from the backend system, an indication of at least one of: that the stored value medium is valid, or a current balance of the stored value medium; and communicate, with the backend system, to at least partially complete the exchange using an amount of resources indicated by at least one of: the stored value medium being valid, or the current balance of the stored value medium.

9. A method for managing a database for stored value mediums, comprising:
receiving, by a device, an indication of information associated with a stored value medium associated with an entity, wherein the information includes a balance of resources associated with the stored value medium and an identifier of the stored value medium;
performing a risk analysis associated with the stored value medium to obtain a risk score for the stored value medium;
populating, by the device, the database with the information based on the risk score for the stored value medium, wherein the database includes a table to link the information associated with the stored value medium with an entity identifier of an entity associated with the stored value medium, the database identifying an aggregated balance of resources associated with the stored value medium;
receiving, by the device, an indication of an exchange associated with the entity;
parsing, by the device, the database using the entity identifier associated with the entity to identify the aggregated balance of resources corresponding to an account associated with the entity; and
communicating, with a backend system associated with the exchange, to enable the exchange to be at least partially completed using the aggregated balance of resources based on searching the database to identify the aggregated balance of resources.

10. The method of claim 9, further comprising:
transmitting, to a user device associated with a user associated with the stored value medium, a user interface for display by the user device, wherein the user interface enables the user to input the information associated with the stored value medium and to link the information associated with the stored value medium to the entity identifier of the entity associated with the stored value medium.

11. The method of claim 10, further comprising:
receiving, from the user device, the indication of information associated with the stored value medium;
determining an offer for the stored value medium based on the balance of resources associated with the stored value medium and a risk score associated with the stored value medium, wherein the offer indicates an amount of resources to be transferred to an account of the user or a payment medium to be provided in exchange for the stored value medium;
transmitting, to the user device, an indication of the offer;
receiving, from the user device, an indication that the offer has been accepted; and
transferring the amount of resources to the account of the user or providing the payment medium based on the receiving the indication that the offer has been accepted.

12. The method of claim 9, wherein the database is linked with the entity associated with the stored value medium and indicates information associated with multiple stored value mediums, wherein the multiple stored value mediums are associated with multiple users.

13. The method of claim 9, wherein receiving the indication of the exchange comprises:
receiving the indication of the exchange associated with the entity, the exchange being associated with a first user that is different than a second user associated with the stored value medium; and
wherein communicating with the backend system to enable the exchange to be at least partially completed using the aggregated balance of resources comprises:
transmitting, to the backend system, a medium indicator that indicates the identifier associated with the stored value medium;
receiving, from the backend system, a resource indicator that identifies an amount of resources applied to the exchange, the amount of resources being associated with the stored value medium; and
updating an entry associated with the stored value medium to reflect an updated balance of the resources associated with the stored value medium, the updated balance being based on the amount of resources applied to the exchange.

14. The method of claim 9, wherein the database comprises a first database, and wherein the method further comprises:
identifying an indication to update the information associated with the stored value medium included in a second database; and
updating an entry included in the second database, the entry being associated with the information associated with the stored value medium, wherein updating the entry includes modifying information indicated by the entry or removing the entry from the second database.

15. The method of claim 9,
wherein the risk score indicates a risk level associated with transferring the stored value medium to an entity associated with the database; and
wherein populating the database comprises:
populating the database with the information associated with the stored value medium based on the risk score satisfying a threshold; or
transmitting, to a user device of a user associated with the stored value medium, an indication that the stored value medium cannot be stored in the database when the risk score does not satisfy the threshold.

16. The method of claim 9, wherein communicating with the backend system to enable the exchange to be at least partially completed using the aggregated balance of resources comprises:
communicating, with the backend system, to at least partially complete the exchange using resources associated with multiple stored value mediums that include the stored value medium, wherein the multiple stored value mediums are associated with the entity, and wherein information associated with the stored value mediums is stored in the database.

17. A non-transitory computer-readable medium storing a set of instructions, the set of instructions comprising:
one or more instructions that, when executed by one or more processors of a device, cause the device to:
receive an indication of information associated with a stored value medium associated with an entity, wherein the information includes a balance of resources associated with the stored value medium and an identifier of the stored value medium;

perform a risk analysis associated with the stored value medium to obtain a risk score for the stored value medium;

populate a data store with the information based on the risk score for the stored value medium, wherein the data store includes a table to link the information associated with the stored value medium with an entity identifier of an entity associated with the stored value medium, the data store identifying an aggregated balance of resources;

receive an indication of an exchange associated with the entity, wherein the exchange is initiated using a medium that is different than the stored value medium;

search the data store using the entity identifier to identify the aggregated balance of resources corresponding to an account identifier associated with the entity; and perform an action to enable the exchange to be at least partially completed using the aggregated balance of resources.

18. The non-transitory computer-readable medium of claim 17, wherein the one or more instructions further cause the device to:

transmit, to a user device, a user interface for display by the user device, wherein the user interface enables the user to input the information associated with the stored value medium; and wherein the one or more instructions, that when executed by the one or more processors cause the device to receive the indication of the information associated with the stored value medium, cause the device to:

receive, from the user device, the indication of the information associated with the stored value medium that is input to the user device via the user interface.

19. The non-transitory computer-readable medium of claim 17, wherein the one or more instructions further cause the device to:

receive, from a user device, a request associated with current information associated with the stored value medium;

identify the current information associated with the stored value medium, wherein the current information includes an updated balance associated with the stored value medium after performing the action to enable the exchange; and transmit, to the user device, a user interface for display by the user device that indicates the current information associated with the stored value medium.

20. The non-transitory computer-readable medium of claim 17, wherein the one or more instructions, that when executed by the one or more processors cause the device to perform the action to enable the exchange, cause the device to:

transmit, to a backend system associated with the exchange, an indication of the identifier of the stored value medium;

receive, from the backend system, an indication of at least one of: that the stored value medium is valid, or a current balance of the stored value medium; and communicate, with the backend system, to at least partially complete the exchange based on an amount of resources indicated by at least one of: the stored value medium being valid, or the current balance of the stored value medium.

* * * * *

UNITED STATES PATENT AND TRADEMARK OFFICE
CERTIFICATE OF CORRECTION

| | | |
|---|---|---|
| PATENT NO. | : 11,935,100 B2 | |
| APPLICATION NO. | : 17/302216 | |
| DATED | : March 19, 2024 | |
| INVENTOR(S) | : Benjamin Yin et al. | |

It is certified that error appears in the above-identified patent and that said Letters Patent is hereby corrected as shown below:

In the Claims

In Claim 3, Column 22, Line 7, "associated with the at least one stored" should be changed to -- "associated with the stored" --.

Signed and Sealed this
Fourteenth Day of May, 2024

Katherine Kelly Vidal
*Director of the United States Patent and Trademark Office*